(12) United States Patent
Farnham et al.

(10) Patent No.: US 10,032,175 B2
(45) Date of Patent: Jul. 24, 2018

(54) SENSOR NETWORK OPTIMIZATION ALGORITHM

(75) Inventors: Christopher Farnham, Somerville, MA (US); Daniel Schrage, Smoerville, MA (US)

(73) Assignee: CHARLES RIVER ANALYTICS, INC., Cambridge, MA (US)

( * ) Notice: Subject to any disclaimer, the term of this patent is extended or adjusted under 35 U.S.C. 154(b) by 947 days.

(21) Appl. No.: 12/420,950

(22) Filed: Apr. 9, 2009

(65) Prior Publication Data

US 2009/0259543 A1    Oct. 15, 2009

Related U.S. Application Data

(60) Provisional application No. 61/043,540, filed on Apr. 9, 2008.

(51) Int. Cl.
  *G06Q 30/02*    (2012.01)
  *G06F 9/50*    (2006.01)
  *G06Q 10/06*    (2012.01)

(52) U.S. Cl.
  CPC ........... *G06Q 30/02* (2013.01); *G06F 9/5083* (2013.01); *G06Q 10/067* (2013.01); *G06Q 30/0275* (2013.01)

(58) Field of Classification Search
  CPC .................................................. G06Q 9/5083
  USPC ........................................................ 705/7.11
  See application file for complete search history.

(56) References Cited

U.S. PATENT DOCUMENTS

| | | | | |
|---|---|---|---|---|
| 5,134,685 | A | * | 7/1992 | Rosenbluth ..................... 706/25 |
| 7,130,807 | B1 | * | 10/2006 | Mikurak ..................... 705/7.25 |
| 2007/0174179 | A1 | * | 7/2007 | Avery ............................ 705/37 |

* cited by examiner

*Primary Examiner* — Russell S Glass

(74) *Attorney, Agent, or Firm* — Barlow, Josephs & Holmes, Ltd.

(57) ABSTRACT

An algorithm for modeling and optimizing control of a complex and dynamic system is provided to facilitate an allocation of the resources on the network that is the most efficient. The algorithm serves to depict the complex network of available resources using market-based negotiation wherein resources are defined as available buyers and sellers in an efficient market. Selling agents are offering their available resources for sale in accordance with parameters that correspond to the actual limitations of that actual resource and the buyers are looking to make a purchase from one of the sellers that presents a resource with the greatest utility to them. In order to overcome inefficiencies that result from the potential of inefficient allocation, the present invention has further endeavored to introduce an efficiency-arbitrage agent that scans the overall body of transactions to identify and remedy inefficient market transactions.

13 Claims, 4 Drawing Sheets

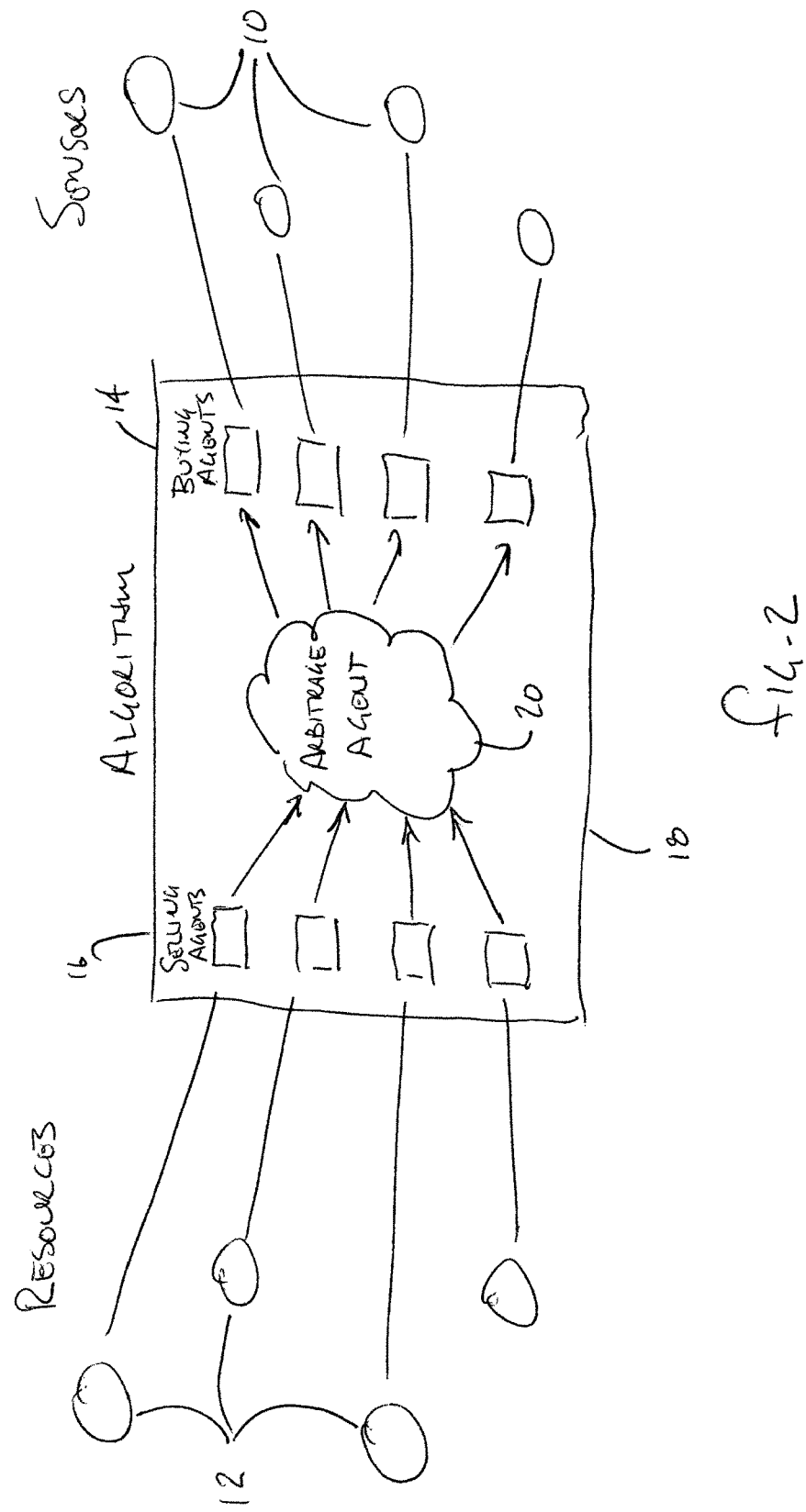

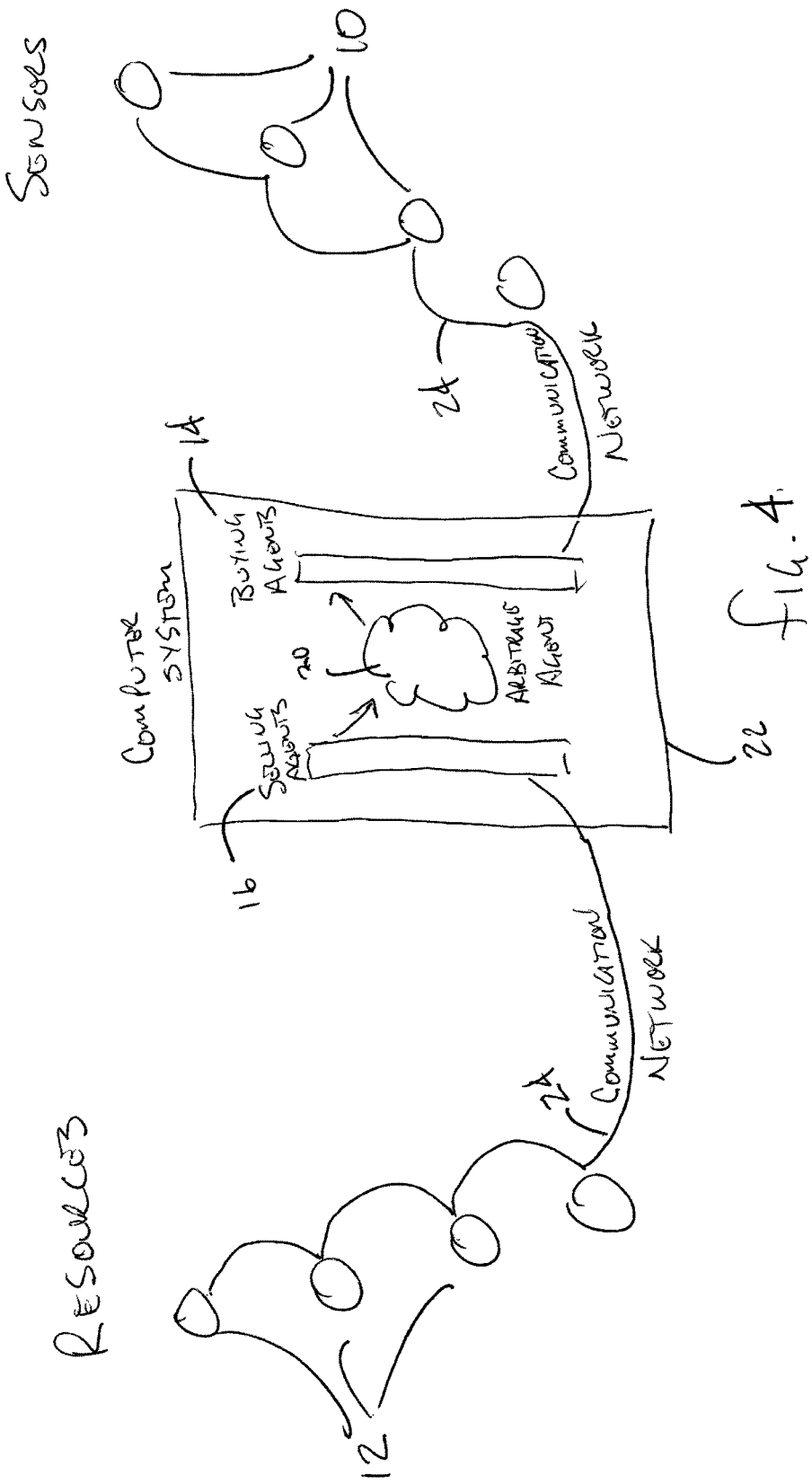

SENSOR NETWORK OPTIMIZATION ALGORITHM

CROSS-REFERENCE TO RELATED APPLICATIONS

This application is related to and claims priority from earlier filed U.S. Provisional Patent Application No. 61/043,540, filed Apr. 9, 2008.

GOVERNMENT LICENSE RIGHTS

The U.S. Government has a paid-up license in this invention and the right in limited circumstances to require the patent owner to license others on reasonable terms as provided for by the terms of W9113M-05-C-0173 awarded by the US Government.

BACKGROUND OF THE INVENTION

The present invention relates generally to an algorithm for solving resource optimization problems within computer systems. More specifically, the present invention relates to a method and an apparatus that uses resource allocation techniques derived from a financial market model to solve a multi-objective sensor based network optimization problem.

As technology reaches into every aspect of modern human life, we find that huge sensor networks are deployed across large geographic areas and even across the globe. Such sensor-based networks actively detect information that is in turn processed and utilized to deploy and/or control various resource devices that are attributed to and controlled by the network. In enhancing and controlling the overall operation of such a sensor-based network, there are often several competing objectives that one would like to optimize. The difficulty arises in that rarely is it possible to optimize such a network in a manner wherein the optimization of each of the various competing objectives coincides. As a result, the control system is often left with tradeoff solutions that represent a compromise solution that exists between the individual objectives. Ultimately, it is this compromise solution that must be incorporated into the final control solution. The goal therefore in solving such an optimization problem that has a multi-objective structure is to determine a set of points that describe the optimal or most efficient trade-offs between the competing objectives.

The above-identified problem, however, becomes more complex as the overall structure of the network increases in scale. As the number of sensor inputs or resources available on the network increase, the system itself becomes highly dynamic and the complexity of the optimization process itself increases dramatically making it quite likely that large errors and inefficient resource allocations result. In a very simplistic example, feedback control systems are widely used to maintain the output of a dynamic system at a desired value in spite of external disturbance forces that would move the output away from the desired value. In this context, a household furnace controlled by a thermostat is an example of a feedback control system. The thermostat continuously measures the air temperature of the house, and when the temperature falls below a desired minimum temperature, the thermostat turns the furnace on. When the furnace has warmed the air above the desired minimum temperature, the thermostat then turns the furnace off. The thermostat-furnace system maintains the household temperature at a constant value in spite of external disturbances such as a drop in the outside air temperature. Similar types of feedback control are used in many applications.

While a simple control loop may work in the above noted example, as systems become more complex, these simple on-off feedback controls are insufficient. More advanced control systems rely on combinations of proportional feedback control, integral feedback control, and derivative feedback control. Feedback that is the sum of proportional plus the integral plus the derivative feedback is often referred to in the context of PID control. Even in these control systems, however, the network system parameters are assumed to be relatively linear, time invariant and stable. Accordingly, the base assumptions in a PID control system create a problem in attempting to optimize systems that have sensor inputs that are time varying, highly nonlinear, and unstable. For example, the system depicted in the dynamic model may contain parameters that are either poorly known or depend on a changing environment. If the parameter variation is small and the dynamic model is stable, then the PID controller may be sufficient. However, if the parameter variation is large, or if the dynamic model is unstable, then it is necessary to add adaptation or intelligent (AI) control to the PID control system.

In any case, evaluating the resource allocation characteristics of a nonlinear or highly dynamic system is often difficult, in part due to the lack of a general analysis method. The trade off when controlling such a system is to find certain equilibrium points in the operation of the system and linearize those characteristics at or around the equilibrium points. Optimization is then based on evaluating the pseudo (linearized) characteristics near the equilibrium point. This technique works poorly, if at all, for complex systems described by models that are unstable or dissipative.

Therefore, there is a need for an algorithm that allows optimization of the resources on a complex and highly dynamic sensor based network. There is a further need of an algorithm that facilitates the optimization of a highly dynamic sensor based network that evaluates the whole world of possible allocations of the resources available on the network and makes a global determination of the most efficient allocation of those resources despite the existence of local or regionalized allocation loops.

BRIEF SUMMARY OF THE INVENTION

In this regard, the present invention provides an improved algorithm for modeling and optimizing control of a complex and dynamic system. Generally, in the context of the present invention, the algorithm is directed toward the optimization of resource allocation throughout any complex and dynamic system. In optimizing and controlling such complex and dynamic systems it is highly desirable to provide an allocation of the resources on the network that is the most efficient.

In operation the algorithm serves to depict the complex network of available resources using market-based negotiation. More preferably, the algorithm of the present invention serves to depict defined resources within the system as available buyers and sellers in an efficient market. In this regard, the representative selling agents are offering their available resources for sale, wherein the offer is made in accordance with parameters that correspond to the actual limitations of that actual resource and the buyers are looking to make a purchase from one of the sellers that presents a resource with the greatest utility to them. Such limitations may include, but are not limited to time frame, physical location, demographic information, suitability for a certain purpose, capability of the resources, etc.

While the depiction of the resources as buyers and sellers in an efficient market serves as a good starting point for the algorithm of the present invention, difficulties still arise in the assumptions typically associated with such a market based model. For example, these models are traditionally based on a seller driven market place while in contrast the algorithm of the present invention is operating in a buyer driven market such that the most efficient seller is served up to satisfy the given buyer. In these cases, when the model shifts from a seller market to a buyer market, it is possible to introduce unlimited inefficient allocations. In order to overcome inefficiencies that result from the potential of inefficient allocation, the present invention has further endeavored to introduce an efficiency-arbitrage agent. The efficiency-arbitrage agent's only purpose is to constantly scan the overall body of transactions to identify inefficient market transaction. When the agent finds a transaction that is being completed on the basis of high value despite there being higher efficiency buyers with which the transaction can be completed, the agent "buys" the resources out of the inefficient transaction and then "re-sells" those resources into the more efficient transaction.

In this manner, the algorithm allows for the use of a proven dynamic market model that has been tested in financial markets for many years to be adapted into a sensor network dynamic system for the allocation of resources. With the addition of the efficiency-arbitrage agent, this dynamic model allows for a highly efficient control of available resources in the context of highly complex problem solving applications.

It is therefore an object of the present invention to provide a method and system to employ a market based model that allows high efficiency optimization of the resources on a complex and highly dynamic sensor based network. It is a further object of the present invention to provide a method and system that facilitates the optimization of a highly dynamic sensor based network that evaluates the whole world of possible allocations of the resources available on the network and makes a global determination of the most efficient allocation of those resources despite the existence of local or regionalized allocation loops.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 2 is a schematic illustration of an alternate embodiment of the method of the present invention;

FIG. 4 is a schematic illustration of a system for implementation of the method of the present invention.

DETAILED DESCRIPTION OF THE INVENTION

Figure 1:
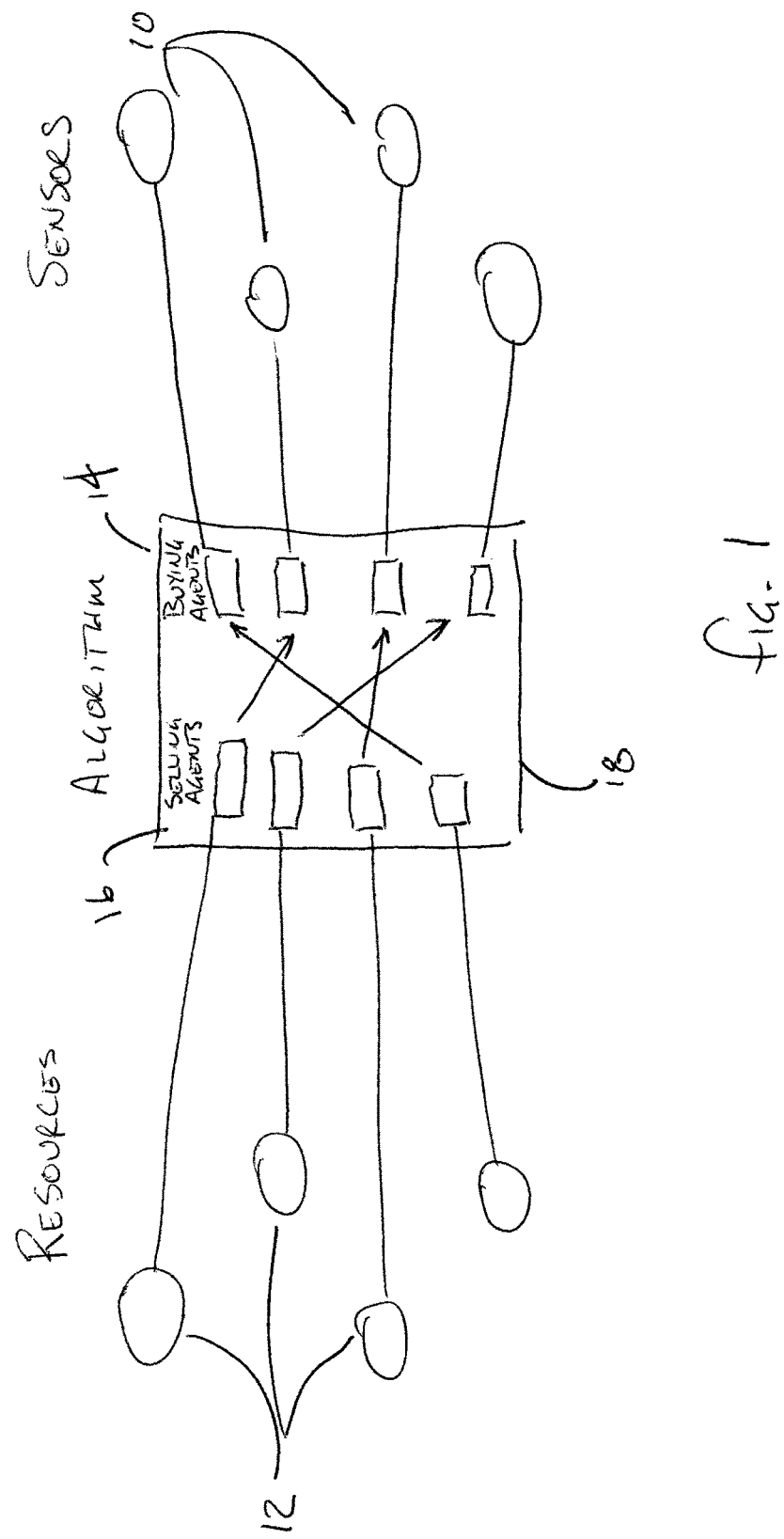
FIG. 1 is a schematic illustration of the method of the present invention.

Now referring to the drawings, the method and system of the present invention is most generally illustrated at FIG. 1 as an improved algorithm for modeling and optimizing control of a complex and dynamic system. As stated above, in the context of the present invention, method and system is directed toward the optimization of resource allocation throughout any complex and dynamic system such that key components of the system are represented by software agents that control the system components and trade the capabilities of the components in an artificial economic market where the software agents act as buyers and/or sellers. Further, arbitrage agents are employed in order to disrupt inefficiencies in the market activity thereby insuring that the system remains in the optimal dynamic equilibrium.

In one example, shown at FIG. 1, the method and system of the present invention can be illustrated in a missile defense system. In a missile defense system there are information gathering tasks accomplished using sensors 10 such as radar sites for example and intercept tasks for eliminating incoming missiles. The sensors 10 available in the context of the information gathering tasks are collected and offered for sale in the marketplace via sensor or buying agents 14. Further, resources 12 in the form of weapons systems for filling the tasks by stopping incoming missile attacks, are offered for sale in the market place by resource or selling agents 16. In the marketplace conducted via the algorithm 18 of the present invention, each of the agents 14, 16 acts to maximize its own utility in selling its sensor task 10 or acquiring a needed resource 12. For example, a radar site may have information that it detected an incoming missile. Its representative buying agent 14 is therefore is looking to sell this information and acquire a resource 12 to address the incoming missile. In a market based model, this buying agent 14 is willing to pay a higher price than any other buying agent 14 for immediate acquisition of a resource 12 having the necessary capabilities for a response. Based on this any resource agents 16 having a resource 12 that suits the needs of the buying agent 14 will sell its resource 12 to the buying agent 14 for a response strike against the incoming threat.

Inherent in this marketplace model however is the possibility of unlimited inefficiencies in that each agent 14, 16 will act in a completely selfish manner. Accordingly, in extending the above example, the buying agent 14 will take the first selling agent 16 with a resource 12 available whether or not that resource 12 is the most efficient choice and the selling agent 16 will not let go of the transaction despite the existence of a more efficient resource 12 to satisfy the need of the buying agent 14. As a result, the possibility of great inefficiency is introduced. Should the load on the system become more complex or dynamic, the need to reduce this inefficiency becomes critical. As one could appreciate such a system is highly dynamic in that the number of available resources is potentially enormous while each resource also falls into a certain category and has a certain set of limitations within which it must operate. For example, the radar sites may be able to scan an infinite number of slices of the sky yet have a limited overall range. The incoming missiles may enter the system at an infinite number of locations and follow a track that would require the allocation of several radar sites to determine their telemetry. Finally, only certain defensive sites are available to respond to certain types of incoming threats. Therefore, the scope and limitations of each resource must all be balanced when developing a control scheme that enables an efficient response to the incoming threat.

To satisfy the need to manage the efficiency of the marketplace model, the present invention, as depicted at FIG. 2, introduces an arbitrage agent 20 that acts similar to a futures contract process wherein the arbitrage agent 20 pre-buys offers from selling agents 16 and/or buying agents 14 in order to smooth out inefficiencies and load balance the resources. In a purely market based system, the process is wholly seller driven. The goods are offered in the market and the price vector and available goods are published by the selling agent. The buying agent returns a vector of bids for the available goods and the market continues to adjust until all of the goods are cleared. There is no regard for efficient allocation of goods between buyers and sellers only that the goods are cleared to the highest bidder. In adding the arbitrage agent 20 to the method and system of the present invention, a just-in-time marketplace is created wherein the buyer agent 14 creates the task or need for goods, each seller agent 16 examines the buyer agent 14 offer and the arbitrage agent 20 assigns the tasks to the buyer agents 14 according to their bids. In this case however, the task item does not actually close or "sell" until a buyer actually commences with the task. Until the point at which the task is commenced it may be reassigned by the arbitrage agent 20.

In the context of the present invention the arbitrage agent's only purpose is to constantly scan the overall body of transactions to identify inefficient market transaction. When the arbitrage agent finds a transaction that is being completed on the basis of high value despite there being higher efficiency buyers with which the transaction can be completed, the arbitrage agent "buys" the resources out of the inefficient transaction and then "re-sells" those resources into the more efficient transaction.

Figure 3B:
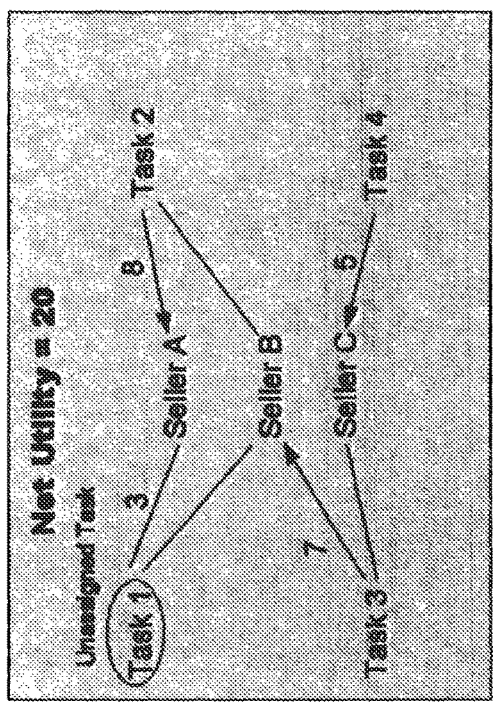
FIGS. 3a-3b are illustrations showing the reallocation of the resources before and after use of an arbitrage agent in accordance with the teachings of the present invention.
Figure 3A:
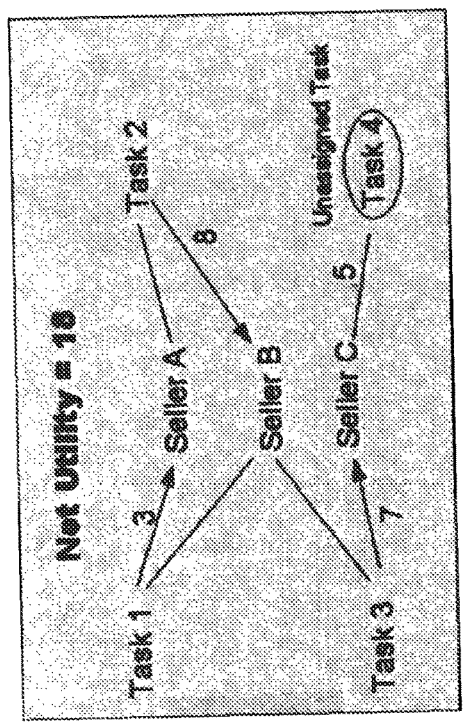

In a simple example shown in FIGS. 3a and 3b three tasks (Tasks 1, 2 and 3) having numeric values depicted over the assignment arrows are being assigned to three sellers (Sellers A, B and C) as shown by the arrows. Further, the lines without arrows depict the other sellers that are able to complete the tasks. In a dynamic system with traditional inefficiencies as shown in particular at FIG. 3a, when a fourth task (Task 4) having a higher value of 5 as compared to the low value of 3 associated with Task 1 arrives and a requirement that it be completed by Seller C the market model fails because all of the sellers act selfishly. Seller A will not release the lowest value task, Task 1 to take Task 2 and Seller B will not release Task 2 to pick up Task 3 freeing Seller C to attend to Task 4. With the introduction of the arbitrage agent, as depicted at FIG. 3b, the inefficiencies are remedied in that the arbitrage agent forces trades amongst sellers. Seller C sells Task 3 to Seller B, Seller B sells Task 2 to Seller A, Seller A drops the low priority Task 1 and Seller C picks up high priority Task 4. In this manner, the arbitrage agent insures that the lowest priority tasks are dropped when there is an overlap in assets and the buyer and seller agents act selfishly.

Similarly, the present invention has particular applicability in the context of the placement of advertisement resources into various spaces allocated for such advertisements on Internet web pages. Further, in this example, the present invention will be illustrated in the context of a system as shown at FIG. 4. It is well known that certain Internet pages draw a certain demographic and it is highly desirable to ensure that the most appropriate target advertising is placed into those pages. Further, discrete viewers carry a demographic description of themselves as they build a browsing history. That browsing history then assists in targeting advertisements to that discrete viewer. In implementing the method and system with Internet advertisement placement, the sensors 10, resources 12 and a computer system 22 for running the algorithm 18 of the present invention are all in communication with an electronic communication network 24. The buyer agents 14 represent the sensors 20 in the form of Internet sites having available advertisement space and the seller agents 16 represent the resources 12 in the form of the various ads that could potentially fill that available advertising space. When a browser views the Internet page, the algorithm 18 based on the browser's demographic as detected via sensors 10 determines advertisement resource 12 with the highest utility (lucrative and therefore efficient) to target to that browser. By employing a just-in-time marketplace the buyer agent 14 creates the task or need for and advertisement, each seller agent 16 examines the buyer agent 14 offer and the arbitrage agent 20 assigns the tasks to the buyer agents 14 according to their bids. In this case however, the task item does not actually close or "sell" until a buyer actually places that ad into the browser framework. In this manner as higher value seller agents are located the assignments of advertisements can be reassigned by the arbitrage agent up until it is actually placed.

In either of the above examples it is highly desirable to provide an allocation of the resources on the network that is the most efficient. In the missile defense context it is clear that the most efficient result produces the most reliable defensive protection. In the advertisement placement system, such efficiency in targeting the most appropriate demographic results in the highest potential premium for the ad space. In operation the algorithm serves to depict the complex network of available resources using market-based negotiation. More preferably, the algorithm of the present invention serves to depict the resources as available buyers and sellers in an efficient market such that the representative seller agents are offering their available resources according to parameters that correspond to the actual limitations of that actual resource and the buyers are looking to make a purchase from one of the sellers that presents a resource with the greatest utility. Further, while two specific examples have been provided they are intended only to be illustrative of the generally concepts of the present invention wherein a method and system is provided that serves to analyze a dynamic network system in order to produce the most efficient allocation of the resources available on that network. As a result the examples provided are intended to be illustrative and not limiting.

It can therefore be seen that the method and system of the present invention allows for the use of a proven dynamic market model that has been tested in financial markets for many years to be adapted into a sensor network dynamic system for the allocation of resources. With the addition of the efficiency-arbitrage agent, this dynamic model allows for a highly efficient control of available resources in the context of highly complex problem solving applications. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for optimizing the allocation of physically operating resources in a manner that allows each resource to complete a task based on the most efficient allocation:
   a communication network;
   a plurality of physical resources in communication with said network, said physical resources capable of completing tasks;
   a plurality of sensors in communication with said network, said sensors dynamically detecting tasks that need to be completed and generating task requests that are transmitted along said communications network;
   a computer system in communication with said network, said computer system dynamically detecting and depicting said plurality of physical resources as available sellers and dynamically detecting and depicting said task requests as available buyers, said computer system dynamically matching each one of said seller resources with one of said buyer task requests based on a priority level assigned to each of said buyer task requests; and
   an arbitrage agent operating in said computer system and reviewing all of the transactions between the buyer and seller agents, said arbitrage agent identifying inefficient seller resource and buyer task request matches where a match was made on the basis of high value, dynamically breaking said inefficient seller resource and buyer task request matches by buying the seller resource out of the match and reselling the seller resource to a buyer task request having higher efficiency to produce a more efficient transaction.

2. The system of claim 1, wherein each of said resources are represented by a selling agent and each of said tasks are represented by a buying agent, wherein a selling agent assigns its resource to a buying agent to complete the task based on an economic market hierarchy.

3. The system of claim 2, wherein the economic market hierarchy is a high bid hierarchy.

4. The system of claim 1, wherein each of said resources are represented by a selling agent and each of said tasks are represented by a buying agent, wherein a buying agent selects a resource from a selling agent to complete a task based on an economic market hierarchy.

5. The system of claim 4, wherein the economic market hierarchy is a high bid hierarchy.

6. The system of claim 1, wherein each of the seller agents is offering their available resources according to para meters that correspond to actual limitations of the underlying resource and each of the buyer agents is looking to make a purchase from one of the seller agents that presents a resource with the greatest utility.

7. The method of claim 1, wherein said seller agents represent missile defense resources and said buyer agents represent missile detection systems.

8. The method of claim 1, wherein said seller agents advertisements available for placement and said buyer agents represent advertisement space on an Internet web site.

9. The system of claim 1, wherein each of said resources is represented by a selling agent and each of said tasks is represented by a buying agent, wherein an arbitrage agent operating in said computer system reviews transactions between the buyer and seller agents, said arbitrage agent identifying inefficient market transactions and reallocating the buyer and seller agents into a more efficient transaction.

10. A method for optimizing the allocation of physically operating resources in a manner that allows each resource to complete a task based on the most efficient allocation:
    offering the availability of a plurality of physical resources over a communication network using a seller agent, said resources capable of completing a task;
    offering a plurality of task requests generated by a plurality of sensors over a communication network using a buyer agent, said sensors dynamically detecting tasks that need to be completed and generating said task requests;
    using a computer system in communication with said network to dynamically detect and depict said plurality of physical resources as available sellers and to dynamically detect and depict said plurality of task requests as available buyers, said computer system dynamically matching one of each of said seller resources with one of said buyer task requests based on a priority level assigned to each of said buyer task requests; and
    operating an arbitrage agent to reviewing all of the matches, said arbitrage agent identifying inefficient seller resource and buyer task request matches where a match was made on the basis of high value, dynamically breaking said inefficient seller resource and buyer task request matches by buying the seller resource out of the match and reselling the seller resource to a buyer task request having higher efficiency to produce a more efficient match.

11. The method of claim 10, wherein each of the seller agents is offering their available resources according to para meters that correspond to actual limitations of the underlying resource and each of the buyer agents is looking to make a purchase from one of the seller agentsthat presents a resource with the greatest utility.

12. The method of claim 10, wherein said seller agents represent missile defense resources and said buyer agents represent missile detection systems.

13. The method of claim 10, wherein said seller agents advertisements available for placement and said buyer agents represent advertisement space on an Internet web site.

* * * * *